(12) United States Patent
Quinn et al.

(10) Patent No.: US 8,241,038 B2
(45) Date of Patent: Aug. 14, 2012

(54) SIMULATOR UTILIZING A NON-SPHERICAL PROJECTION SURFACE

(75) Inventors: Edward W. Quinn, Uniontown, OH (US); Randall W. Wallace, Uniontown, OH (US); Michael R. Vogel, Stow, OH (US); Jason L. Seeliger, Akron, OH (US)

(73) Assignee: Lockheed Martin Corporation, Orlando, FL (US)

( * ) Notice: Subject to any disclaimer, the term of this patent is extended or adjusted under 35 U.S.C. 154(b) by 1264 days.

(21) Appl. No.: 11/483,292

(22) Filed: Jul. 7, 2006

(65) Prior Publication Data
US 2007/0009862 A1    Jan. 11, 2007

Related U.S. Application Data

(60) Provisional application No. 60/697,676, filed on Jul. 8, 2005.

(51) Int. Cl.
*G09B 9/08* (2006.01)
(52) U.S. Cl. ............ 434/38; 434/29; 434/30; 434/35; 434/43; 434/44; 434/45; 434/69; 348/121; 348/123; 348/744; 348/E9.025; 353/30; 359/443; 359/451; 472/59; 472/60
(58) Field of Classification Search ............ 434/33, 434/38, 40, 29, 30, 43, 45, 69, 35, 44; 348/121; 348/123, 744, E9.025; 353/30; 359/443, 359/451; 472/59, 60
See application file for complete search history.

(56) References Cited

U.S. PATENT DOCUMENTS

| | | | | |
|---|---|---|---|---|
| 3,574,283 A * | 4/1971 | Albers | ............ | 73/178 R |
| 3,923,370 A * | 12/1975 | Mostrom | ............ | 359/630 |
| 3,933,326 A * | 1/1976 | Schauffler | ............ | 244/118.5 |
| 4,022,522 A * | 5/1977 | Rain | ............ | 359/443 |
| 4,103,435 A * | 8/1978 | Herndon | ............ | 434/43 |
| 4,276,029 A * | 6/1981 | Gilson et al. | ............ | 434/43 |
| 4,348,185 A * | 9/1982 | Breglia et al. | ............ | 434/43 |
| 4,348,186 A * | 9/1982 | Harvey et al. | ............ | 434/44 |
| 4,350,489 A * | 9/1982 | Gdovin | ............ | 434/40 |
| 4,463,380 A * | 7/1984 | Hooks, Jr. | ............ | 348/580 |
| 4,473,355 A * | 9/1984 | Pongratz | ............ | 434/44 |
| 4,632,508 A * | 12/1986 | Connelly | ............ | 359/572 |
| 4,634,384 A * | 1/1987 | Neves et al. | ............ | 434/44 |
| 5,137,450 A | 8/1992 | Thomas | | |
| 5,140,790 A * | 8/1992 | Modglin et al. | ............ | 52/81.4 |
| 5,175,575 A * | 12/1992 | Gersuk | ............ | 353/94 |
| 5,226,816 A * | 7/1993 | Hawkins | ............ | 434/38 |
| 5,320,534 A * | 6/1994 | Thomas | ............ | 434/44 |
| 5,433,608 A * | 7/1995 | Murray | ............ | 434/29 |
| 5,490,784 A * | 2/1996 | Carmein | ............ | 434/55 |
| 5,582,518 A * | 12/1996 | Henique et al. | ............ | 434/44 |
| 5,748,264 A * | 5/1998 | Hegg | ............ | 348/746 |
| 5,774,174 A * | 6/1998 | Hardie | ............ | 348/38 |
| 6,042,238 A * | 3/2000 | Blackham et al. | ............ | 353/94 |
| 6,152,739 A * | 11/2000 | Amery et al. | ............ | 434/38 |
| 6,160,666 A * | 12/2000 | Rallison et al. | ............ | 359/630 |
| 6,201,516 B1 * | 3/2001 | Tanide et al. | ............ | 345/7 |
| 6,433,840 B1 * | 8/2002 | Poppleton | ............ | 348/745 |
| 6,669,346 B2 * | 12/2003 | Metcalf | ............ | 353/94 |

(Continued)

*Primary Examiner* — Xuan Thai
*Assistant Examiner* — Jack Yip
(74) *Attorney, Agent, or Firm* — Withrow & Terranova, PLLC

(57) ABSTRACT

The present invention relates to a simulator comprising at least one projector arranged to project an image, and a non-spherical, generally continuous, dome-like projection surface on which the image is displayed.

10 Claims, 4 Drawing Sheets

U.S. PATENT DOCUMENTS

| | | | |
|---|---|---|---|
| 6,715,888 B1 * | 4/2004 | Raskar et al. | 353/94 |
| 6,727,971 B2 * | 4/2004 | Lucas | 352/85 |
| 6,735,015 B1 * | 5/2004 | Blackham | 359/451 |
| 6,752,498 B2 * | 6/2004 | Covannon et al. | 351/240 |
| 6,814,578 B2 * | 11/2004 | Vorst | 434/38 |
| 7,385,684 B2 | 6/2008 | Young et al. | |
| 7,621,647 B1 * | 11/2009 | Colucci et al. | 353/121 |
| 7,791,799 B1 * | 9/2010 | Lejeune et al. | 359/443 |
| 7,871,270 B2 * | 1/2011 | Seeliger et al. | 434/38 |
| 7,959,307 B1 * | 6/2011 | Colucci et al. | 353/121 |
| 8,194,193 B2 * | 6/2012 | Streid et al. | 348/744 |
| 2002/0131018 A1 * | 9/2002 | Lucas | 352/85 |
| 2002/0186348 A1 * | 12/2002 | Covannon et al. | 351/240 |
| 2005/0264879 A1 * | 12/2005 | Deter et al. | 359/451 |
| 2006/0250322 A1 * | 11/2006 | Hall et al. | 345/8 |
| 2007/0141538 A1 * | 6/2007 | Quinn et al. | 434/16 |
| 2007/0196793 A1 * | 8/2007 | Seeliger et al. | 434/29 |
| 2009/0102915 A1 * | 4/2009 | Arsenich | 348/53 |
| 2009/0201430 A1 * | 8/2009 | Streid et al. | 348/744 |

* cited by examiner

SIMULATOR UTILIZING A NON-SPHERICAL PROJECTION SURFACE

CROSS-REFERENCE TO RELATED APPLICATION

This application claims the benefit of U.S. Provisional Application No. 60/697,676, filed Jul. 8, 2005.

TECHNICAL FIELD

The present invention relates generally to simulators. More particularly, the present invention relates to simulators that project images on a curvilinear surface.

BACKGROUND OF THE INVENTION

It will be appreciated that flight simulators attempt to replicate, as much as possible, an actual aircraft cockpit with instruments and a surrounding canopy. It is also desirable for the simulator—of any type—to provide a simulator dome with a display medium that provides as realistic as possible "outside-the-window" visual representations. Accordingly, the display medium or the surfaces upon which images are displayed or projected are quite large.

Current display technology has made great strides in reducing the space required for dome displays in flight simulators. Smaller projectors, for example, have reduced the interior space required for mountings and displays. However, a cockpit and its mounting dome itself, plus the projectors and their mountings must still fit within the space allocated to the display. It will be appreciated that in addition to general operational training, flight simulators are used to rehearse combat missions and bombing runs. Oftentimes, these rehearsals must take place on aircraft carriers or hastily constructed forward operating bases. As such, large spaces to accommodate known display domes for simulators are unavailable. It will also be appreciated that even slight modifications to the dome can result in negative training during a mission rehearsal.

Accordingly, the need exists for a simulator dome that provides customers an affordable product that fits in a relatively small space. And there is a need for a simulator dome with reduced size that provides a realistic training experience.

SUMMARY OF THE INVENTION

In light of the foregoing, it is a first aspect of the present invention to provide a simulator utilizing a non-spherical projection surface.

It is another aspect of the present invention to provide a simulator that includes at least one projector arranged to project an image and a non-spherical, generally continuous, dome-like projection surface on which the image is displayed. This surface may be either front or back projected.

Yet another aspect of the present invention includes a simulator comprising at least one projector arranged to project an out-the-window image, a helmet-mounted display worn by a trainee, wherein the helmet-mounted display includes a viewing surface of a heads-up image, and a non-spherical, generally continuous, dome-like projection surface on which the out-the-window image is displayed, and wherein the viewing surface and the projection surface allow their respective images to be merged by the trainee's eye.

Still another aspect of the present invention includes a method of providing a simulated environment comprising projecting a first image on a non-spherical projection surface, displaying a second image on a viewing surface of a helmet mounted display, and providing a focus depth variation that is less than or equal to 0.2 diopters between the projection surface and the viewing surface.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

Figure 1:
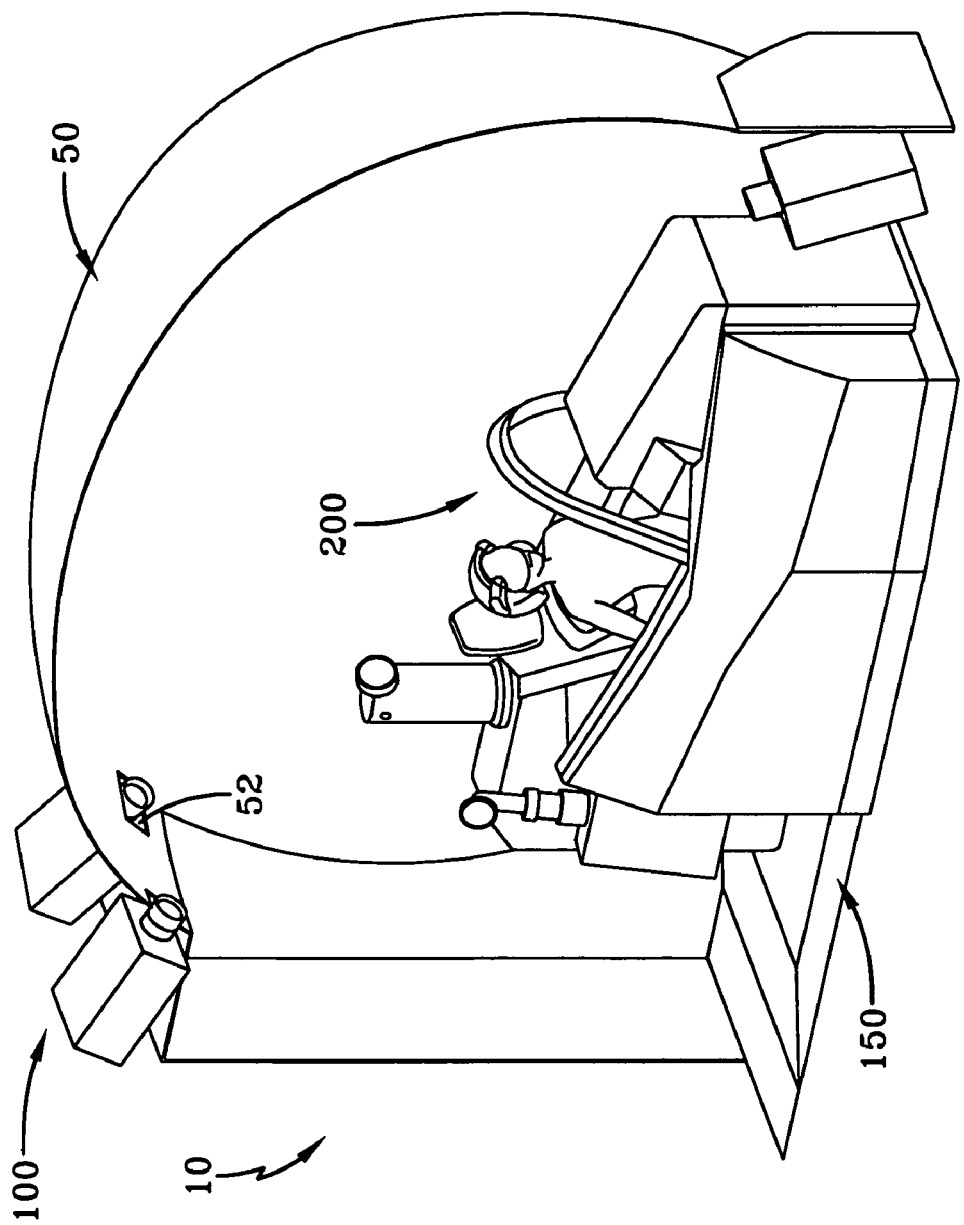
FIG. 1 is a perspective drawing of a partially broken-away simulator made according to the concepts of the present invention.

The present concept is best understood by referring to the drawings. Although the drawings are generally tailored towards a flight simulator, aspects of the present concept are equally applicable to land-vehicle simulators, water-vehicle simulators, or other various simulation environments. As shown in FIG. 1, a simulator of the present concept is generally designated by numeral 10. A simulator 10 may include: a non-spherical projection surface 50, one or more projectors 100, a floor platform 150, and a mock instrumentation apparatus 200.

The simulator 10 includes a projection surface 50. This projection surface 50 may be non-spherical, generally continuous, and dome-like. The term "non-spherical" indicates that although various embodiments of the projection surface 50 may have spherical characteristics, the projection surface 50 viewed as a whole is not spherical. For example, in a particular embodiment the projection surface is ellipsoidal or substantially ellipsoidal in shape.

The term "continuous" indicates that the shape of the projection surface 50 may be generally defined by any function of first and second degree continuity. In mathematical terms, a function has first and second degree continuity over an interval x if it is twice differentiable at any point within that interval. However, even if a function has first and second degree continuity at some point c, it may not be differentiable at c. In layman's terms, the shape of the projection surface 50 includes only rounded surfaces and contains no "sharp edges." While the shape of the projection surface 50 is generally continuous, the surface itself may have various non-uniformities such as projector apertures 52, an opening for the trainee to enter and leave the simulator (not shown), as well as other similar types of discontinuities.

In another embodiment, the term "continuous" includes a faceted display, made up of flat or curved surface segments, in which the vertical dimension is reduced to provide a lower height for the simulator 10. This is a special application in which continuity exists only within the facet, not across the facet edges.

The term "dome-like" indicates that the projection surface 50 is generally enclosed overhead. The projection surface 50 may have a concave shape whose concavity faces downward. "Dome-like" does not mean that the projection surface 50 is perfectly spherical; it is sufficient that the projection surface 50 is simply a curved surface.

The projection surface 50 may take advantage of the fact that the trainee's movement is generally more confined in the horizontal plane than in the vertical plane. For example, in a particular cockpit, a trainee might be able to move eight or more inches horizontally but only three inches vertically. Because of this asymmetry, the focus disparity between a head mounted display and the image projected onto the projection surface 50 may be less in the vertical plane than in the horizontal plane. In fact, the projection surface's vertical Diopter variation may be larger than its horizontal Diopter variation due to this fact. This reduces Diopter (focus) difference in the vertical dimension and hence allows the surface to be closer and still not exceed the threshold. Furthermore, changes in shape in the horizontal plane may be confined to the differences induced by the trainee's capability to move forward versus the capability to move sideways. The movement sideways may be restricted by the trainee's helmet striking the canopy, whereas the movement forward may be restrained by the straps holding the trainee close to the seat.

Figure 2:
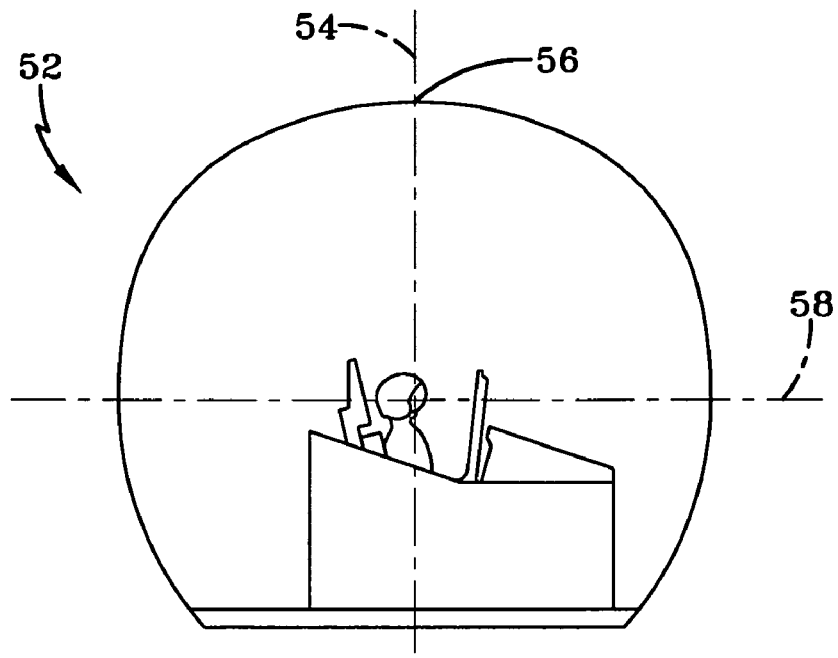
FIG. 2 is an elevational profile of a projection surface of the simulator.

The projection surface 50 has various horizontal and vertical profiles. The vertical profiles are generally continuous. FIG. 2 shows one possible vertical profile 52. As illustrated, a vertical profile 52 may be generally symmetric about a central axis 54 (notwithstanding the location of a door, projector apertures, or other discontinuities in the projection surface). Often, this central axis 54 may coincide with the position of an apex 56. Relative to the floor platform 150, an apex 56 is a highest point of the projection surface 50. In various embodiments of the present concept, an apex 56 is more than about 1.5 meters from the floor platform 150, but less than about 4 meters from the floor platform 150. While some embodiments will have a vertical profile 52 that is symmetric about a central axis 54, other embodiments will not demonstrate this characteristic. For example, various embodiments may have an apex that is positioned nearer to the back of the simulator, causing the projection surface's upper region to slope from back to front. Other embodiments may have multiple apexes. The vertical profile 52 may also be characterized by a horizon 58. The horizon 58 is the region in the same general horizontal plane as the trainee's eyes. In a particular embodiment, the horizon 58 has a tangential component that is perpendicular to the plane in which the floor platform 150 resides.

Figures 3A, 3B:
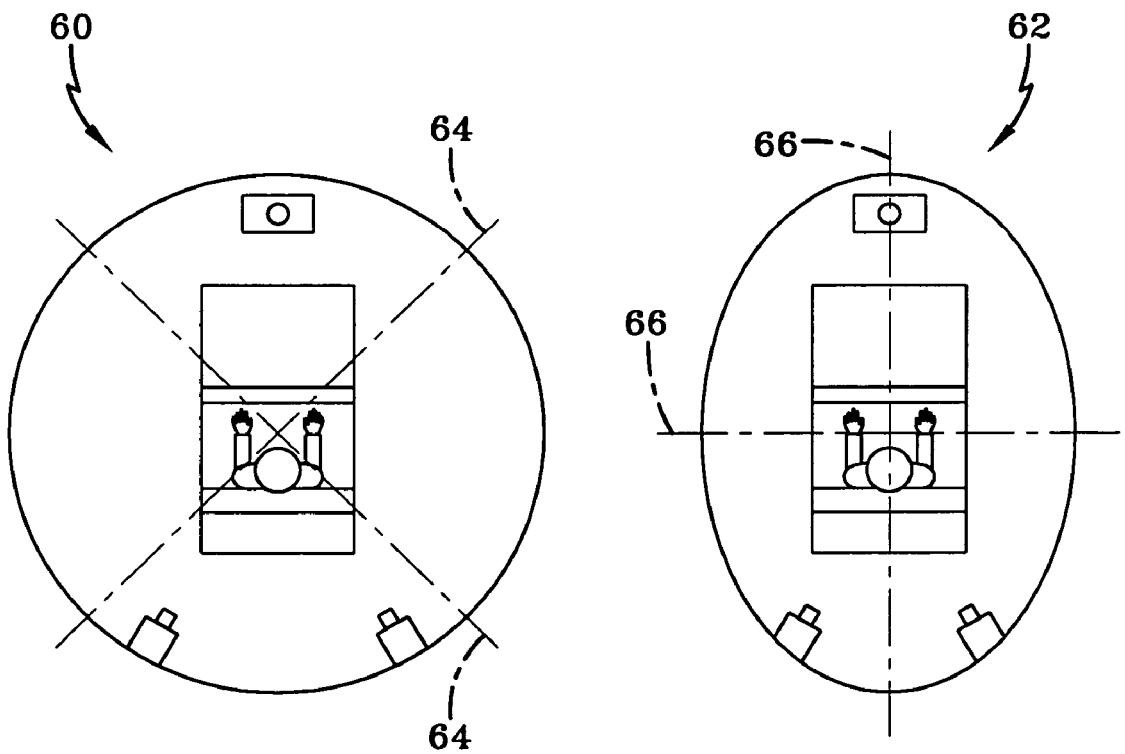
FIG. 3A is a horizontal profile of the projection surface of the present concept.
FIG. 3B is a horizontal profile of an alternative embodiment of the projection surface.

The projection surface 50 also has horizontal profiles that are generally continuous. FIGS. 3A and 3B show two distinct horizontal profiles 60 and 62 respectively. FIG. 3A shows a circular horizontal profile 60. Because such a projection surface has a circular profile, it may be symmetric about an infinite number of central axes 64. FIG. 3B shows a non-circular profile 62 that may be symmetric about a limited number of central axes 66. While some embodiments will have a horizontal profile that is symmetric about a central axis, other embodiments will not demonstrate this characteristic. Again, the figures shown are merely illustrative and do not limit the scope of the present invention.

The projection surface 50 may be composed of any suitable material including, but not limited to: fiberglass, aluminum, foam, or any other naturally occurring or synthetic substance. The projection surface may include one or more layers. If the projection surface 50 is translucent or semi-transparent it may be made from any material having such properties, such as glass or acrylic for example. Additionally, such a translucent or semi-transparent surface 50 may have an additional coating layer or a coating embedded within the projection surface 50 itself on which the projected image is displayed.

Referring back to FIG. 1, the simulator 10 may include one or more projectors 100. The projectors 100 collectively project an image of a simulated environment. For a front projected display, ideally, the projectors 100 are arranged to minimize shadowing due to the trainee and the mock instrumentation apparatus 200. As previously noted, the projectors 100 may protrude through the projection surface 50. If desired, transparent plates may be inlaid in the projection surface 50 that allow the projectors 100 to project an image onto the projection surface 50. In the case of a back projected display, the projectors are arranged to eliminate self-shadowing and to minimize the horizontal footprint of the display.

Still referring to FIG. 1, the simulator 10 may include a floor platform 150. The floor platform 150 may be attached to the projection surface 50. In various embodiments, hydraulics and other mechanical apparatus may be attached to the underside of the floor platform 150. These motor or hydraulic controlled mechanical parts cause the simulator to pitch, roll, incline, decline, rotate, or otherwise move about. These parts may offer a more realistic simulation experience.

Other various embodiments will not include these mechanical parts. In these other embodiments, the underside of the floor platform may rest directly on a floor of a building or other structure. Embodiments that do not include the additional mechanical parts may be particularly desirable for customers who desire an affordable simulator that may fit into a relatively small space. In particular, when the floor platform rests directly on the floor of a building or other structure and the projection surface is non-spherical, customers may receive a particularly compact simulator.

Still referring to FIG. 1, the simulator 10 may also include a mock instrumentation apparatus 200. Although the drawings are generally tailored towards a mock instrumentation apparatus relating to a flight simulator, aspects of the present concept are equally applicable to land-vehicle simulators, water-vehicle simulators, or other various simulation environments. A goal of the mock instrumentation apparatus is to provide a trainee with realistic simulation controls and with a realistic simulation environment.

Figure 4:
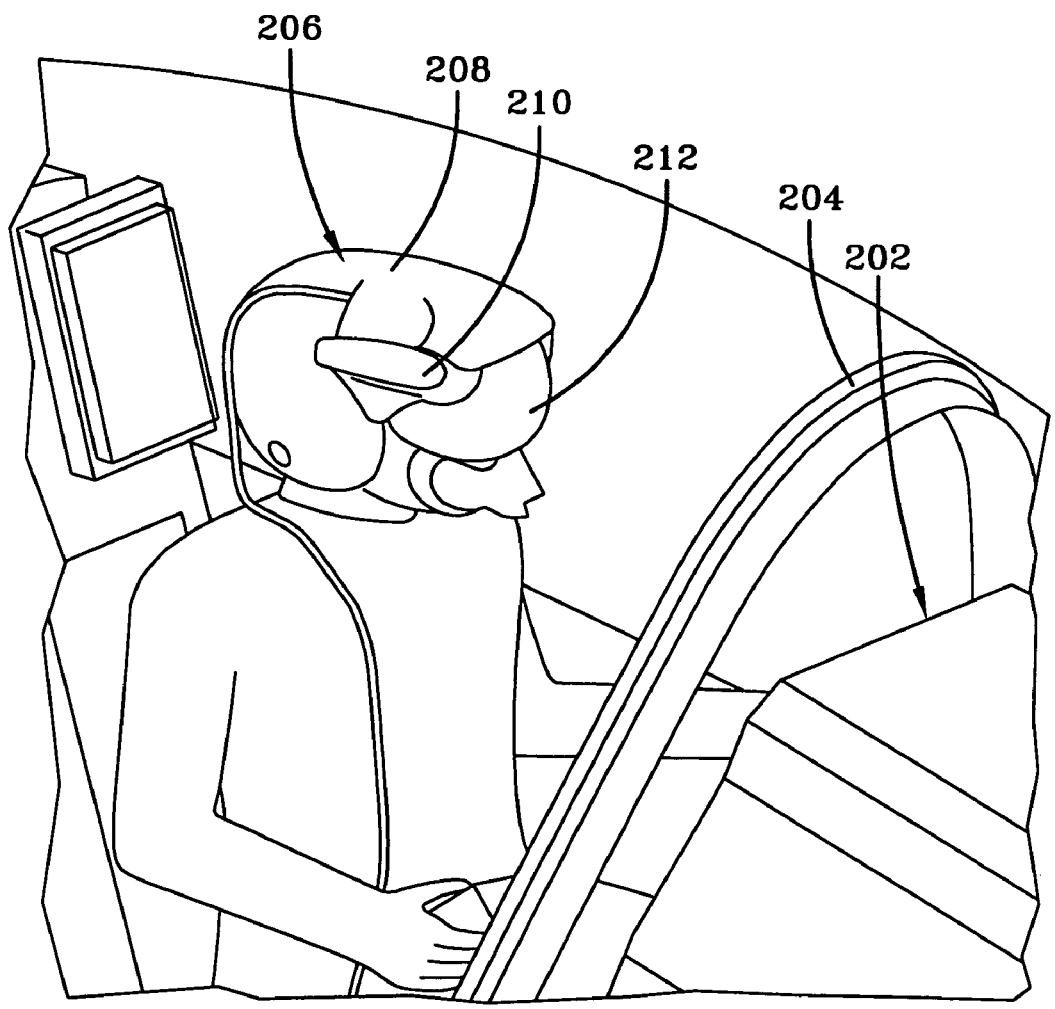
FIG. 4 is a perspective view of a trainee wearing a helmet-mounted display utilized with the simulator.
Figure 5:
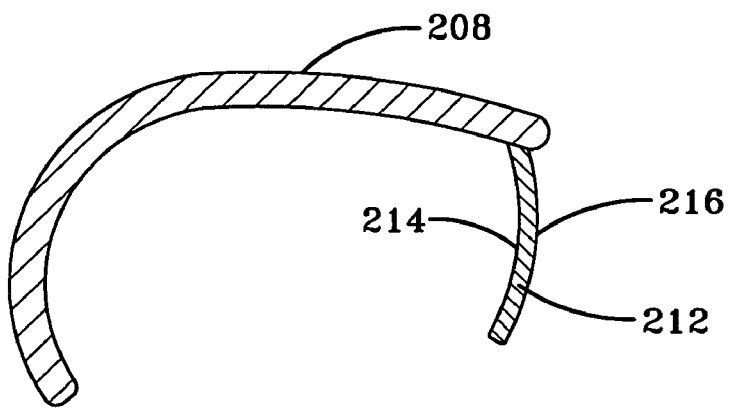
FIG. 5 is a cross-sectional view of a helmet shell and visor of the helmet-mounted display.

Referring now to FIG. 4, the mock instrumentation apparatus 200 includes an instrumentation panel 202, a skeletal canopy 204, and a head-mounted display 206. A trainee may wear the head-mounted display 206 in order to make the simulation more realistic. As best seen in FIG. 5, the head-mounted display 206 may include a helmet shell 208, a heads-up graphics generator 210, and a visor 212.

The helmet shell 208 generally surrounds a trainee's head. It may be made of any rigid substance.

The heads-up graphics generator 210 may be provided remotely or included in or on the helmet shell 208. The generator 210 generates an image that is conveyed electronically to and/or projected on the helmet mounted display in any number of ways. The heads-up graphics generator 210 generally provides the trainee with additional information by way of the heads-up display surface 218. This additional information may include a plane's speed, remaining fuel, proximity of various targets, or any other relevant data. In one embodiment, the heads-up graphics generator 210 may be a projector that is mounted on the exterior of the helmet shell 208. In other embodiments, the heads-up graphics generator 210 may be a projector mounted inside the helmet shell. In still other embodiments, the heads-up graphics generator 210 may transmit images to Liquid-Crystal-Displays (LCDs) or other devices in the visor itself.

The visor 212 is configured to allow the trainee to see at least a portion of the projection surface 50. As shown in FIG. 5, the visor 212 is connected to the helmet shell 208 and includes an inner surface 214 and an outer surface 216, between which a thickness is defined. In addition to allowing the trainee to see at least a portion of the projection surface 50, the visor 212 may provide a heads-up display surface 218 for displaying the information generated by the heads-up graphics generator 210. In various embodiments, the heads-up display surface 218 is displayed on selected portions of the visor's outer surface 216. One such embodiment is where a heads-up graphics generator 210 is located on the outside of the helmet shell 208 and projects an image onto the visor's outer surface 216. In other embodiments, the heads-up display surface 218 is the visor's inner surface 214. An example of this type of embodiment is where a heads-up graphics generator 210 is located on the inside of the helmet and projects the image onto the visor's inner surface 214. In still other embodiments, the heads-up display surface 218 is found between the visor's outer surface and the inner surface. An example of this embodiment might include a heads-up graphics generator which remotely generates the digital image which is transmitted electronically to the visor which may be made up of LCDs that are located in the visor itself. In other embodiments, the heads-up display surface will not be found on the visor, but will be found in another region of the simulator. For example, the heads-up display surface may be mounted on the mock instrumentation apparatus.

In various embodiments, the heads-up display surface and the projection surface are designed to allow a trainee to visually merge the heads-up display surface's graphics with the projection surface's image. In order for trainees to be able to merge these graphical images, it is generally accepted that the focus depth variation is less than 0.2 diopters between projection surface and heads-up display surface. Nonetheless, the present invention relates to simulators that have any focus depth variation between the projection surface and heads-up display surface. A diopter is defined as, "a unit of measurement of the refractive power of lenses equal to the reciprocal of the focal length measured in meters." If the focus depth variation is greater than 0.2 diopters between projection surface and the heads-up display surface, it is generally accepted that a trainee will be unable to merge the two images. Such a distortion would adversely affect the trainee's training experience.

Figure 6:
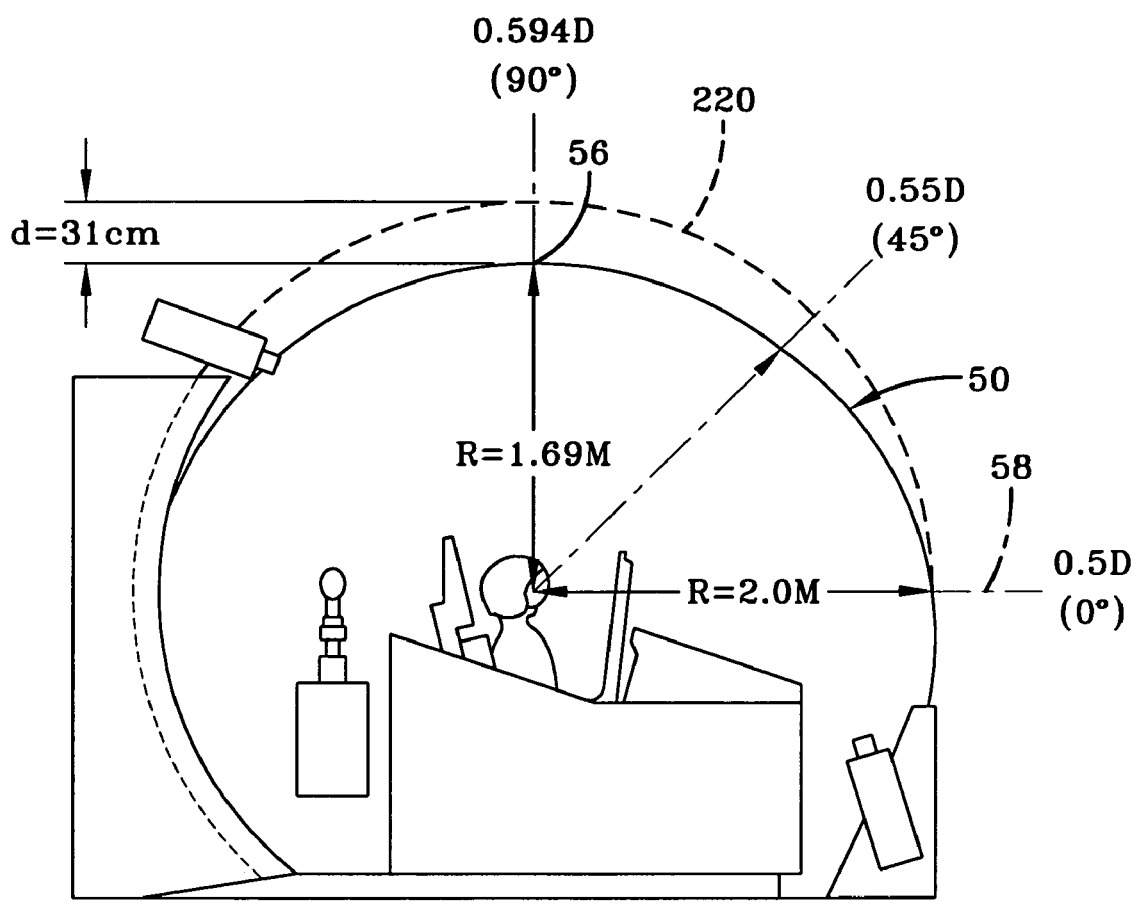
FIG. 6 is a detailed elevational side view of an embodiment of the non-spherical projection surface.

FIG. 6 provides an example illustrating how the simulator may be designed so the trainee can merge the heads-up display surface's graphics with the projection surface's image. This example is merely one embodiment provided to help explain aspects of the current concept. This example in no way limits the scope of the invention. Briefly, FIG. 6 shows the non-spherical, dome-like, and generally continuous projection surface 50. A spherical surface 220 is also shown for comparison. At the horizon 58, the projection surface 50 has a radius of 2 meters. Accordingly, to view the image on the horizon 58, the trainee's eye should have a focal length of about 2 meters. Thus, when the trainee views the horizon 58, the refractive power of his eye is 0.5 diopters. At the apex 56, the projection surface has a radius of approximately 1.69 meters. Accordingly, to view the image at the apex, the trainee's eye should have a focal length of approximately 1.69 meters. This focal length corresponds to a refractive power of approximately 0.59 diopters. Thus, the trainee's eye requires a refractive power of 0.5 diopters at the horizon 58 (0.5 D in the drawing) and 0.59 diopters at the apex 56 (0.594 D in the drawing). The focus depth variation is 0.09 diopters. Thus, in this example, assuming that the variation in refractive power due to variation in the heads-up display surface is constant (i.e. the focal length to the heads-up display surface does not change), the focus depth variation is less than 0.2 diopters and the trainee is able to merge the graphics. Note that if the trainee moves his head in a horizontal plane, he will alter the distance to the horizon 58. By only having a focus length variation of 0.09 diopters, this sample design allows a trainee to move his head slightly without exceeding the focus length variation of 0.2 diopters. Thus, the design avoids negative training.

In various other embodiments, a designer may select various size restrictions by picking two or more discrete points on the projection surface and then using a spline function to interpolate points on a continuous curve between the discrete points. For example, a designer may want the non-spherical projection surface to have a height of 3 meters above the trainee, and a horizon of 3.2 meters in front of the trainee. After inputting these required dimensions, a computer or other calculation means may provide him with the complete set of points that will enable manufacture of a non-spherical, dome-like, and continuous projection surface.

The aforementioned invention offers several significant improvements over the prior art. For example, spherical domes require excessive space, particularly height. Unfortunately, the cost of office space and/or new construction is a constant concern for businesses. For many consumers, the cost to build a structure that houses a spherical dome is economically unrealistic. The concept of a non-spherical projection surface allows customers to fit a dome into a smaller space, and thereby opening up new markets for flight simulator manufacturers. Because these non-spherical domes may be designed to fit into standard office space, customers may use existing facilities and thus acquire these simulators more easily. The non-spherical domes will also typically have the same production cost of existing spherical domes. Therefore, the present invention provides customers with a state-of-the-art simulation environment, while also offering them a more flexible, economically beneficial design.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto and thereby. Accordingly, for an appreciation of the true scope and breadth of the invention, reference should be made to the following claims.

What is claimed is:

1. A simulator for a trainee, comprising:
    a mock instrumentation apparatus adapted to provide the trainee with realistic simulation controls;
    at least one projector arranged to project an out-the-window (OTW) image;
    a helmet-mounted display adapted to be worn by the trainee, wherein the helmet-mounted display includes a viewing surface configured to display a heads-up image; and
    a dome-like, non-faceted, ellipsoidal projection surface configured to display the OTW image, wherein said projection surface has a vertical dimension which is reduced relative to a horizontal dimension of said projection surface to allow a lower height for said projection surface and is defined by a function of first and second degree continuity, wherein said projection surface generally encloses overhead the trainee and said mock instrumentation apparatus and at least a portion of the projection surface is overhead the trainee, and wherein a focus depth variation between the heads-up image displayed on the viewing surface and the OTW image displayed on the projection surface is less than or equal to 0.2 diopters so as to allow the heads-up image and the OTW image to be merged by the trainee's eyes.

2. The simulator of claim 1, additionally comprising:
a floor platform that adjoins the projection surface.

3. The simulator of claim 2, wherein
the projection surface has an apex, and
wherein the apex is within 4 meters of a point on the floor platform.

4. The simulator of claim 2, wherein the projection surface has a horizon that has a tangential component that is substantially perpendicular to a plane in which the floor platform resides.

5. The simulator of claim 1, wherein:
the projection surface has a horizontal profile substantially symmetrical about a central axis, and a vertical profile substantially asymmetrical about the central axis.

6. The simulator of claim 1, wherein:
the projection surface has a horizontal profile substantially asymmetrical about a central axis, and a vertical profile substantially asymmetrical about the central axis.

7. A method of providing a simulated environment for a trainee, comprising:
providing the trainee with a mock instrumentation apparatus that provides realistic simulation controls;
projecting a first image on a non-faceted, dome-like, ellipsoidal projection surface, wherein said projection surface is defined by a function of first and second degree continuity and generally encloses overhead the trainee and at least a portion of the projection surface is positioned overhead the trainee, and wherein said projection surface has a vertical dimension which is reduced relative to a horizontal dimension;
displaying a second image on a viewing surface of a helmet mounted display; and
providing a focus depth variation that is less than or equal to 0.2 diopters between the entire non-spherical projection surface and the viewing surface so as to allow the first image and the second image to be merged by the trainee's eyes.

8. A simulator, comprising:
a mock instrumentation apparatus adapted to provide a trainee with simulation controls;
a seat adapted to face the trainee in a forward direction;
a projector adapted to project an out-the-window (OTW) image;
a helmet-mounted display adapted to be worn by the trainee, wherein the helmet-mounted display includes a viewing surface configured to display a heads-up image; and
a non-faceted, dome-like, ellipsoidal projection surface that generally encloses the seat, the projection surface being defined by a function of first and second degree continuity and wherein a first portion of the projection surface is overhead the seat and a second portion of the projection surface is directly in front of the seat in the forward direction, and wherein a vertical dimension of the projection surface is less than a horizontal dimension of the projection surface, and wherein a focus depth variation between the heads-up image and the OTW image is less than or equal to 0.2 diopters at every point on the projection surface from the first portion to the second portion.

9. The simulator of claim 8, wherein the projection surface comprises a third portion that is 90 degrees from the second portion relative to a horizontal plane that intersects the trainee's eyes when facing the second portion, and wherein the focus depth variation between the heads-up image and the OTW image is less than or equal to 0.2 diopters at every point on the projection surface from the second portion to the third portion.

10. An apparatus for a simulator, comprising:
an interface configured to communicate with a head-mounted display; and
a dome-like, non-faceted, ellipsoidal projection surface comprising:
a first portion of the projection surface positioned on an inner top portion of the simulator; and
a second portion of the projection surface positioned on an inner front portion of the simulator,
wherein the projection surface is defined by a function of first and second degree continuity and configured to at least partially enclose a trainee and provide a focus depth variation between a heads-up image displayed on a heads-up display surface of the head-mounted display and an out-the-window (OTW) image displayed on the projection surface that is less than or equal to 0.2 diopters so as to allow the heads-up image and the OTW image to be merged by the trainee's eyes.

* * * * *